United States Patent [19]

Okada

[11] Patent Number: 5,602,675
[45] Date of Patent: Feb. 11, 1997

[54] IMAGE BLUR PREVENTION APPARATUS

[75] Inventor: Tadanori Okada, Yokohama, Japan

[73] Assignee: Canon Kabushiki Kaisha, Tokyo, Japan

[21] Appl. No.: 220,442

[22] Filed: Mar. 30, 1994

[30] Foreign Application Priority Data

Apr. 1, 1993 [JP] Japan .................................. 5-096513

[51] Int. Cl.$^6$ .............................. G02B 27/64; G02B 7/02; G03B 7/08
[52] U.S. Cl. ......................... 359/554; 359/814; 359/824; 396/55
[58] Field of Search ..................... 359/554–557, 359/224, 694–708, 813, 814, 823, 824; 354/202, 430, 70

[56] References Cited

U.S. PATENT DOCUMENTS

| | | | |
|---|---|---|---|
| 3,434,771 | 3/1969 | Alvarez ................................. | 359/554 |
| 5,069,537 | 12/1991 | Kitagishi ............................... | 359/557 |
| 5,398,132 | 3/1995 | Otani .................................... | 359/557 |
| 5,461,513 | 10/1995 | Maruyama ............................ | 359/554 |

*Primary Examiner*—Thong Nguyen
*Attorney, Agent, or Firm*—Fitzpatrick, Cella, Harper & Scinto

[57] ABSTRACT

A movable optical unit for use in image blur prevention and a printed circuit board are connected with a conductive pattern. The conductive pattern is installed so that a driving force for the optical unit is not increased in a specific direction in accordance with a difference in deformation characteristics depending on a direction of the conductive pattern. Specifically, a part at which the conductive pattern is mounted is provided with a slit.

16 Claims, 3 Drawing Sheets

IMAGE BLUR PREVENTION APPARATUS

BACKGROUND OF THE INVENTION

1. Field of the Invention

The present invention relates to an image blur prevention apparatus for preventing image blur which is caused due to camera movement.

2. Related Background Art

There have been proposed a number of apparatuses which are intended to prevent failures in photography due to camera movement by detecting a vibration due to camera movement, displacing a correction lens in response to the detected value and correcting a variation of an optical axis of an image. More specifically, these apparatuses are arranged so that the vibration is detected by a vibration sensor such as an angular acceleration meter or an angular velocity, an angular displacement is electrically or mechanically calculated in accordance with a signal from the vibration sensor, and the correction lens is driven in accordance with this angular displacement information.

Methods of correction by the correction lens include parallel shifting or tilting of the optical axis for some of the photographic lenses, or a combination of parallel shifting and tilting of the optical axis and provision of a variable angle prism (VAP) in a front part of a photographic optical system.

The following particularly describes the method of shifting some of the photographic lenses. This method is adapted so that a correction lens frame is held to be freely slidable either in a pitch direction or in a yaw direction at right angles to the optical axis for a circuit base member by holding a coupling member on the circuit base member of an image blur correcting unit to be movable in a direction (for example, the pitch direction) at right angles to the optical axis for photography and holding the correction lens frame on which the correction lens is mounted on the coupling member to be movable in a direction (for example, the yaw direction) at right angles to the optical axis.

As an actuator for driving the correction lens, a voice coil is fixed to the correction lens frame respectively in the pitch and yaw directions at right angles to the photographic optical axis, and a pair of a yoke and a magnet corresponding to these voice coils are fixed to the circuit base member.

For detecting a shifted position of the correction lens in the pitch and yaw directions, respectively, a light emitting device (or a light receiving device) is held on the correction lens frame and the light receiving device (or the light emitting device) corresponding to the light emitting device is held on the circuit base member to detect the position of the correction lens in response to a quantity of received light from the light emitting device whereby the correction lens is accurately driven and controlled according to this positional information.

In an electrical wiring for the above, a printed circuit board provided with a control circuit for driving and controlling the correction lens is mounted on the circuit base member, an IRED which moves for the circuit base member and the coil serving as the actuator are wired with thin conductors between electrical components and the printed circuit board, and the lengths of conductors are determined with an allowance enough to meet the maximum extent of movement of the correction lens frame, thereby ensuring stable electrical connection for relative movement of the components. In addition, instead of a plurality of conductors, the apparatus is arranged so that electrical connection is made with a U-curved flexible printed circuit board.

In the above conventional example, however, the printed circuit board mounted on the circuit base member and the electrical components such as the IRED and coils, which are relatively moved, have been connected with conductors and therefore the number of man-hours for assemblies such as soldering work and costs have increased. The number of conductors has also increased with variations in their properties and therefore a possibility of breakage of these conductors during assembly would be higher. In addition, it has been troublesome to repair individual conductors.

Wiring with the flexible printed board has been disadvantageous in that the width of the overall pattern of the curved part of the board is excessively large if the wiring patterns are arranged in one assembly, an energizing force by curving the flexible printed circuit board is strong to impede the movement of the correction lens frame and the driving force is changed by a curving direction of the printed board and adversely affect the control as a whole.

SUMMARY OF THE INVENTION

An object of the present invention is to provide an optical apparatus comprising an optical unit which can be moved in at least two different directions; a circuit base member; and a connection member which connects the optical unit and the circuit base member and has a deformation characteristic which differs with the direction, the connection member being adapted to ensure connection so that a driving force for movement of the optical unit is not changed depending on the direction of movement of the optical unit.

The above arrangement is effective to prevent variations of the driving force in accordance with the driving direction of the movable optical unit and occurrence of noises from the currents by separately connecting a plurality of conductors to a plurality of connecting members, for example, for a plurality of connections.

In addition, another aspect of the invention is to provide an optical apparatus comprising an optical unit which is movable in at least two different directions; a circuit base member; and at least two connection members which connect said optical unit and said circuit base member and respectively have a deformation characteristic which differs with the direction.

The above arrangement is effective to prevent variations of the driving force in accordance with the driving direction of the movable optical unit and occurrence of noises from the currents by separately connecting a plurality of conductors to a plurality of connecting members, for example, for a plurality of connections.

DESCRIPTION OF THE PREFERRED EMBODIMENTS

The preferred embodiments of the invention are described below, referring to the accompanying drawings whereof:

In the embodiments described below, an image blur is detected by detecting a vibration of a camera.

Figure 1:
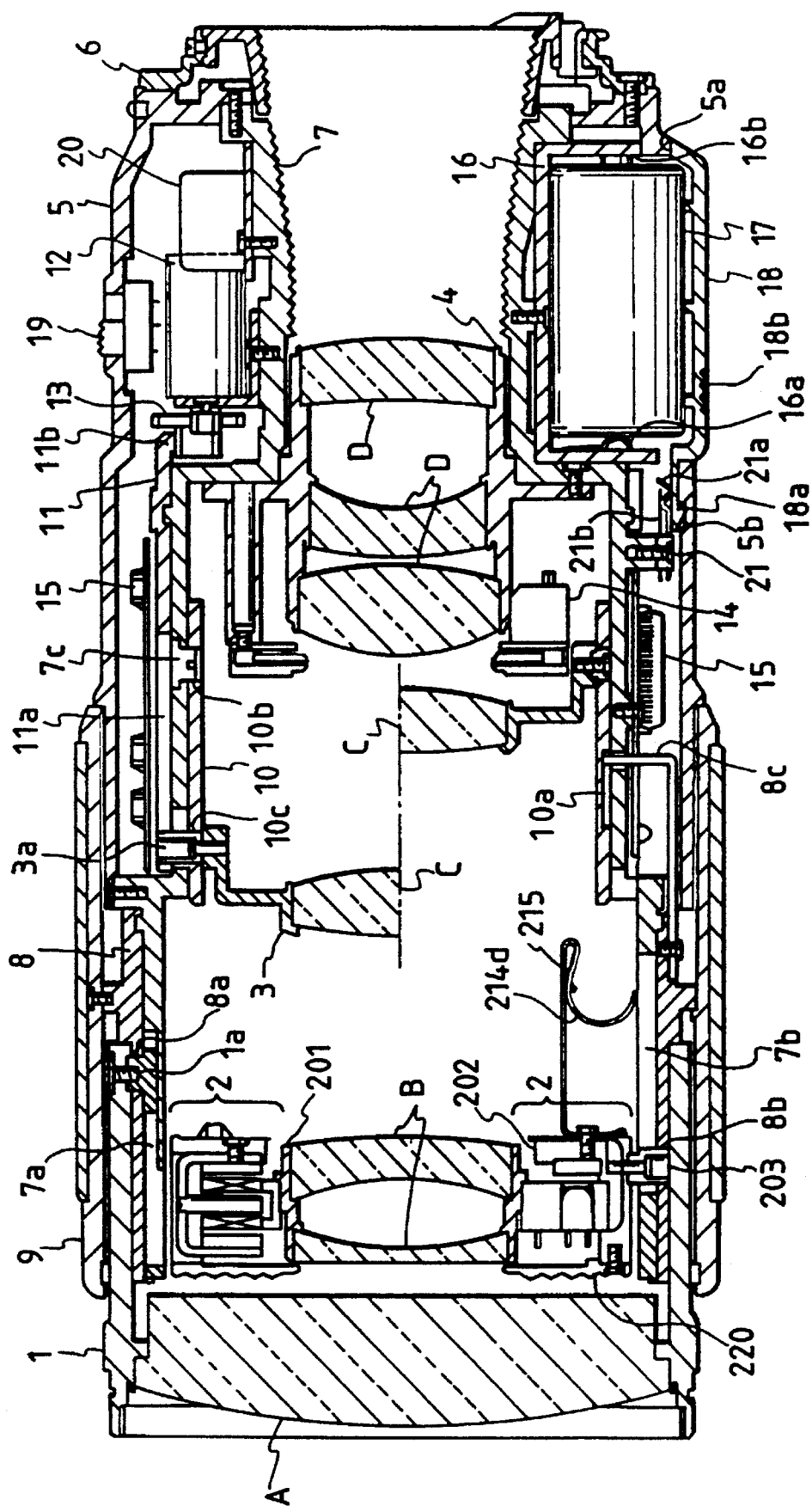
FIG. 1 is a sectional view of a lens body tube provided with an image blur correction apparatus which is an embodiment of the present invention.
Figure 2:
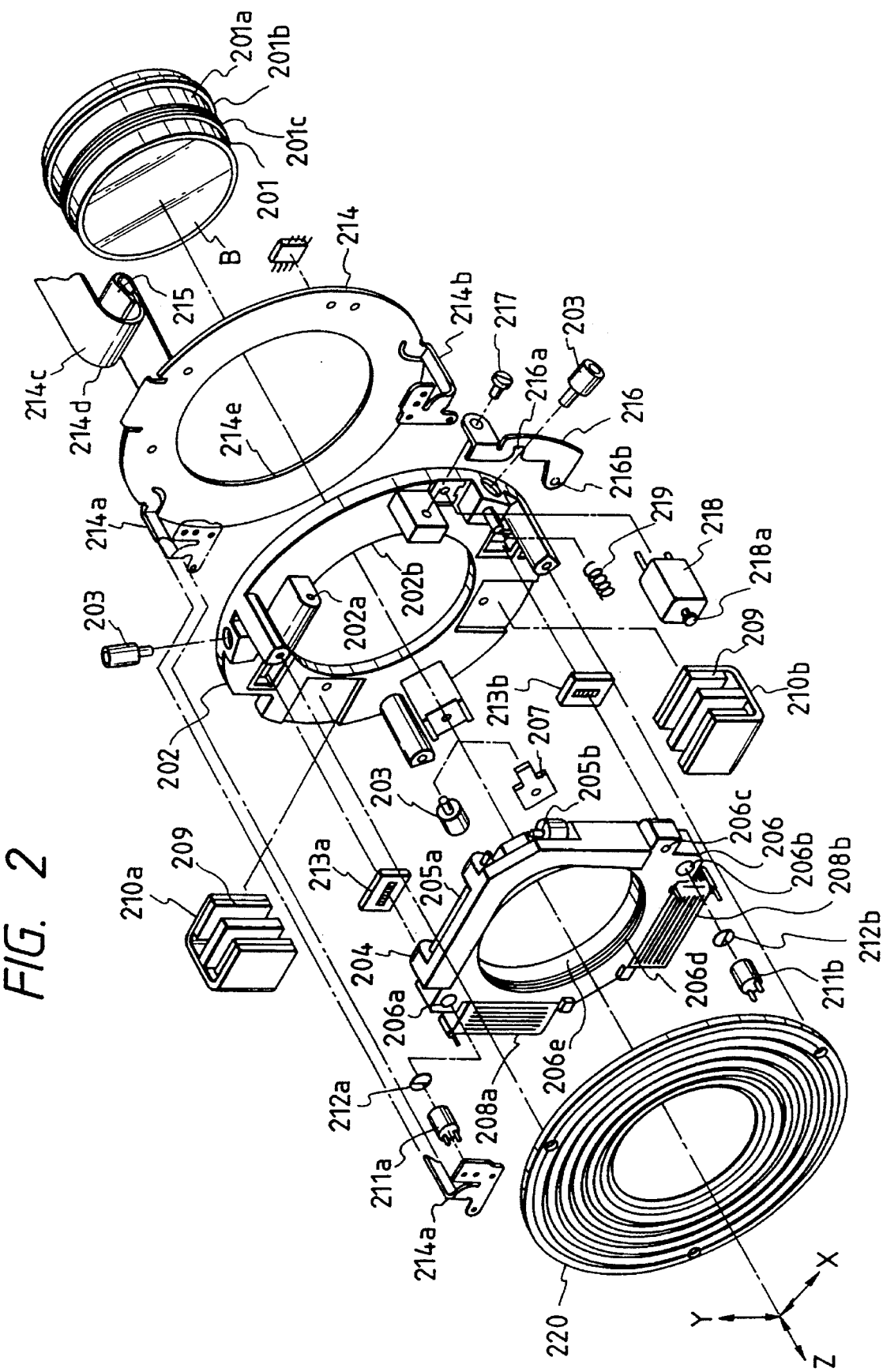
FIG. 2 is a disassembled perspective view of an image blur correction unit of the image blur correction apparatus which is an embodiment of the present invention.

FIGS. 1 and 2 relate to an embodiment of the invention; FIG. 1 is a sectional view of a lens body tube provided with a zooming function in which an image blur correction apparatus is incorporated and FIG. 2 is a disassembled perspective view of the image blur correction unit.

In FIG. 1, A to D respectively denote optical lenses (B is a correction lens) which are secured in a first group body tube 1, a lens hold ring 201 which is a component of the image blur correction unit 2 described later, a third group body tube 3 and a fourth group body tube 4.

Numeral 5 is an external tube in which a mount 6 to be fixed to a camera body, not shown, is secured, numeral 7 denotes a fixed tube which is secured with a screw to the external tube 5 and numeral 8 is a zoom cam tube which is rotatably held with a zoom operating ring 9 around an optical axis.

A key 1a is fitted to the first group body tube 1 and engaged with a cam groove 8a of the zoom cam tube 8 and a straight groove 7a of the fixed tube 7. A roller 203 of the image blur correction unit 2 is fixed to a circuit base member 202 and engaged with a cam groove 8b of the zoom cam tube 8 and a straight groove 7b of the fixed tube 7. Accordingly, the zoom cam tube 8 is rotated by rotating the zoom operating ring 9 and the first group body tube 1 and the image blur correction unit 2 are moved in the optical axis direction by a known cam mechanism. FIG. 1 shows a wide state and operation to the TELE side causes the first group body tube to advance and the image blur correction unit 2 to retract.

Numerals 10 denote a focus cam tube which is rotated along the internal periphery of the fixed tube 7 and movably held in the optical axis direction and, when a zoom key 8c fixed to the zoom cam 8 is engaged with the straight groove 10a and a pin 7c arranged on the fixed tube 7 is engaged with a cam groove 10b, the focus cam tube moves in the optical axis direction while rotating along with rotation of the zoom cam 8.

The third group body tube 3 has a roller 3a, which is engaged with a straight groove 11a of a focus drive tube 11 which is rotatably held at the fixed position on the external peripheries of the cam groove 10c and the fixed tube 7 of the focus cam tube 10. The focus drive tube 11 has a gear 11b at its rear part and is rotated by a rotating force of a motor 12 transmitted to the gear 11b through a reduction gear train 13, whereby the third group body tube 3 moves in the optical axis direction and the focus is adjusted.

The fourth group body tube 4 has a known diaphragm unit 14 at its front end part and is fixed to the fixed tube 7.

15 is a printed circuit board on which electrical components are arranged and which controls focal adjustment, driving of the diaphragm and the image blur correction unit 2 by the signals from the camera body. 16 is a battery case which is fixed with a screw to the rear part of the fixed tube 7 to hold the battery described later and provided with contact fixtures 16a and 16b from which conductors (not shown) are connected to an image blur prevention circuit of the printed circuit board 15. 17 is a battery to be used as a power supply for controlling and driving the image blur correction unit 2 and, in this embodiment, two cylindrical lithium cells are arranged so that two electrodes are positioned in parallel to the optical axis. 18 is a battery cover which prevents the battery 17 from coming off from the battery case 16 to supply a stable power and held to be movable in the optical direction.

For mounting the battery, the battery 17 is pushed in the battery case 16 through an opening 5a of an external tube 5. Accordingly, the battery 17 is temporarily fixed by the energizing force of the contact fixture 16a. Subsequently, the battery cover 18 is fitted to the opening 5a of the external tube 5 from the rear side and slid to the front side. Then a hook 18a provided on the battery cover 18 engages with a groove 5b provided on the internal periphery of the external tube 5 to secure the battery cover 18. For replacing the battery 17, the battery cover 18 is slid to the rear while pressing the front external peripheral part 18b. With this operation, the hook 18a is disengaged from the groove 5b of the external tube 5 and the battery cover 18 can be removed to permit replacement of the battery 17.

19 is a switch for changing over whether correction of the image blur should be carried out and, when this switch 19 is ON, the image blur correction unit 2 can be driven and controlled according to the communications information with the camera body. 20 is a vibration sensor for detecting an unintentional vibration of a camera such as an unintentional joggle of hands in photography and, in this embodiment, a vibration gyro for detecting the angular velocity is presumed.

The above vibration sensor 20 is each provided on the upper side and the lateral side of the external peripheral part near the mount of the fixed tube 7 so that a rotary vibration of the camera in the vertical direction (pitch direction) and in the horizontal direction (yaw direction) can be detected. These vibration sensors 20 are connected with wires to the image blur prevention circuit of the printed circuit board and the outputs of these vibration sensors are converted to an angular displacement by the image blur prevention circuit. In addition, an amount of shift of the correction lens is calculated by adding a focal distance information and a distance-to-subject information and used for drive control.

21 is a battery cover fitting detection switch which is attached to the fixed tube 7 and arranged so that, when the battery cover 18 is mounted, its hook 18a makes a flap 21a contact with another flap 21b, that is, turns on.

The image blur correction unit 2 is described below, referring to FIG. 2.

In FIG. 2, 202 is the base member of the image blur correction unit 2 and provided with rollers 203 each of which is fixed at each of three equally-spaced positions. When this roller 203 engages with the cam groove 8b of the zoom cam tube 8 and the straight groove 7b of the fixed tube 7, the image blur correction unit 2 as a whole is moved in the optical axis direction by the zooming operation described above. 204 is a coupling arm which is supported to be movable in the horizontal direction (hereinafter referred to as the "X direction") in reference to a pin 205a and a pin 205b is fixed in the vertical direction (hereinafter referred to as the "Y direction") and a shifting frame 206 is held to be movable in the Y direction in reference to the pin 205b.

The shifting frame 206 is held to be movable both in the X and Y directions in reference to the base member 202. In addition, a guide plate 207 is fixed to the base member 202 so that the shifting frame 206 does not move in the optical axis direction (Z direction), and the shifting frame 206 is held by and between the guide plate 207 and the base member 202.

Voice coils 208a and 208b are fixedly bonded to the shifting frame 206 for driving in X and Y directions. Yokes 210a and 210b on which magnets 209 are mounted at the positions corresponding to the voice coils 208a and 208b are fixed with screws to the base member 202.

Shifting position detection means of the shifting frame 206 comprises light emitting devices IRED211a and IRED211b which are fixed with slits 212a and 212b in holes 206a and 206b of the shifting frame 206 and light receiving devices PSD213a and PSD213b which are fixed to the base member 202.

214 is a flexible printed circuit board which is fitted to the rear side of the base member 202 and provided with a circuit pattern and electrical components which form part of the image blur prevention circuit. It is also provided with a pair of extension lugs 214a and 214b which are bent to the front side a U-shape. The coil 208a attached to the shifting frame 206 and the terminal of the IRED211a are inserted into and soldered to the holes of the extension lug 214(a), and the coil 208b and the terminal of the IRED211b are similarly soldered to the extension lug 214b. Extension lugs 214a and 214b are drawn out from approximately opposing positions of a doughnut-shaped mounting part. The bending directions of the U-bent portions of the extension lugs are X and Y directions which are arranged to be at right angles to each other. This is intended to uniformly apply a recovery force produced by bending the extension lugs 214a and 214b to the shifting frame 206 in X and Y directions.

The extension lug 214a is described in detail below referring to FIG. 3. When the shifting frame 206 is shifted in the X direction, the connecting parts of the coil 208a at the end and the IRED211a (these components are not shown in FIG. 3) are moved in parallel so that the curvatures of bent portions 51 and 52 are changed. In the present embodiment, a reinforcing pattern portion (between bent portions 51 and 52) is provided at the middle part of the extension lug 241(a) and the extension lug 214a is bent mainly at two positions to minimize the space required. However, if there is available a sufficient space, the extension lug can be bent at a position to have a large U-shaped curve.

Figure 3:
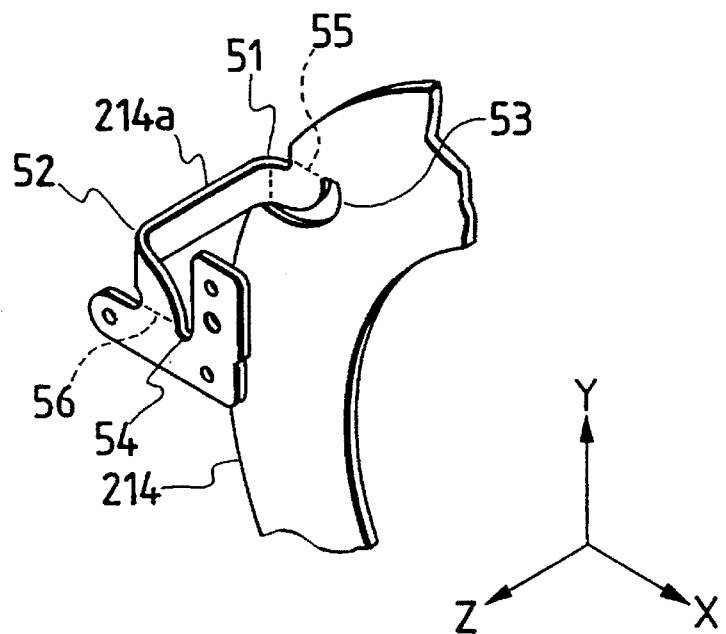
FIG. 3 is a perspective view illustrating a structure of a flexible printed circuit board shown in FIG. 2.

The recovery force of the extension part 214a with a structure as shown in FIG. 3 is small and acts mainly in the optical axis direction (Z direction). Accordingly, it has a less effect in the shifting direction and rather deviates a play of components which are mounted in layers to the optical axis direction, thus preventing movement of the part due to such play.

The extension lug 214a is provided with a mounting part as a base, and slits 53 and 54 to permit bending in a direction at right angles to the U-shaped bent portions 51 and 52. In other words, when the shifting frame 206 is moved in the Y direction, the bent portions 51 and 52 do not change and bent portions 55 and 56 shown with broken lines in FIG. 3 are bent to permit the end part of the extension lug 214a to be movable in parallel.

Bent portions 55 and 56 are not be bent and maintain flatness when the correction lens B is not shifted. The bent portions 55 and 56 are bent to provide a recovery force by shifting the correction lens B. This recovery force acts in a direction where the correction lens is moved toward the center. If the image blur is corrected in normal photography, a large amount of power is consumed to prevent shifting of the correction lens B due to its own weight and therefore such power consumption can be substantially reduced by energizing the correction lens B toward the center with this recovery force.

The above paragraphs have described the extension lug 214a. This is similar to the extension lug 214b when the bending directions are deviated by 90 degrees. In other words, the effects of the recovery forces of the bent portions which act on the shifting frame 206 are made equal both in X and Y directions by arranging two extension lugs 214a and 214b at approximately right angles. Since wiring is divided for two extension lugs 214a and 214b, a clearance between wires is increased to be more effective in reduction of adverse effect of noise.

The flexible printed circuit board 214 has a pull-out part 214c which is bent backwardly and guided by a support member 215 to the rear of the unit. The pull-out part 214c is formed in such a manner that the pull-out part 214c is folded once to the front side at the end of the support member 215, bent again in the U-shape and extended backwardly (refer to FIG. 1). The rear end of the pull-out part 214c is electrically connected to the printed circuit board 15 to communicate with the image blur prevention circuit. The image blur correction unit 2 is moved in the optical axis direction by the zooming operation and, in this case, the bent portion 214d to allow stable signal communications.

Figure 4:
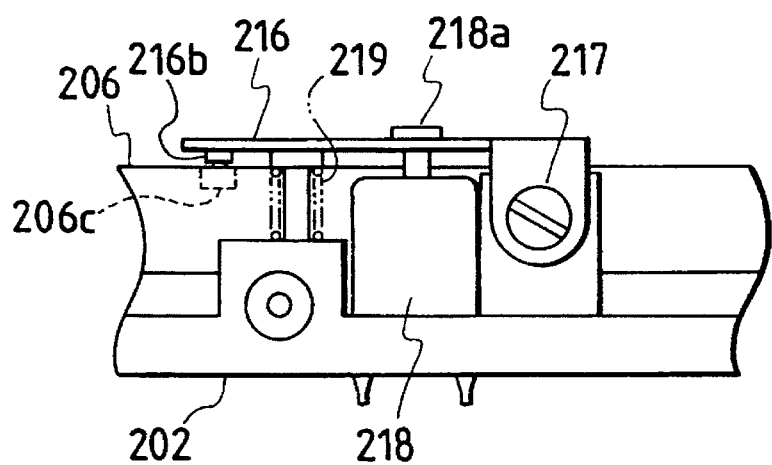
FIG. 4 is a side view of a principal part illustrating a lock mechanism of a correction optical system shown in FIG. 2.

The following describes a lock mechanism of the correction optical system (correction lens B and others) when image blur correction is not carried out, referring to FIGS. 2 and 4.

216 is a lock lever which is fitted with a step screw 217 to the base member and supported to be turnable around the axis of the step screw 217 as the pivot. 218 is a plunger which is internally provided with a solenoid, fixed to the base member 202 and electrically connected to the flexible printed circuit board 214. 219 is a coil spring which is held by the base member 202 to energize the lock lever 216 in a direction where it is kept away from the plunger 218.

When a power is supplied to the plunger 218, a step portion of an actuating shaft 218a is engaged with the groove 216a of the lock lever 216 and therefore the lock lever 216 is attracted against the energizing force, and stabilized by an internal magnet. Therefore, even if the power supply is disconnected, it maintains the stable state. At this time, the shifting frame 206 is driven toward the center, a projection 216b of the lock lever 216 enters into the hole 206c of the shifting frame 206, and the shifting frame 206 is locked at the central position.

If a power is reversely supplied to the plunger 218, the plunger 218 is released from the stable state, the projection 216 of the lock lever 216 is disengaged from the hole 206c of the shifting frame 206 by the energizing force of the coil spring 219, and the shifting frame 206 is ready for shifting.

For assembly of the image blur correction unit 2, the lens hold ring 201 which holds the correction lens B is assembled after the printed circuit board 214 has been arranged and coils 208a, 208b, IRED211a, IRED211b, PSD213a and PSD213b and the plunger 218 have been connected with wires. This procedure is necessary to prevent a damage and stain due to oil splashes of the correction lens B during assembly. In addition, such procedure is intended to reuse the correction lens B which is expensive and will require a lot of man-hours in manufacturing even though the image blur correction unit 2 is checked as defective.

In the present embodiment, one lens unit is made up by mounting and securing the correction lens B comprising a plurality of lens in the lens hold ring 201 and fixed by passing through the opening 214e provided in the flexible printed circuit board 214 and the opening 202a provided in the base member 206 and meshing the threaded part 201c to the threaded part 206d of the shifting frame 206. In this case, the lens hold ring 201 is provided with a fitting surface 201a (which abuts with the opening 202e) to prevent deviation of the optical axis for the shifting frame 206 and a body fitting surface 201b.

220 is a shield plate which is provided with light shielding lines on its front side and installed on an image blur correction unit 2 which has been determined satisfactory in the functional inspection after the assembly process. The shield plate serves to prevent a stray light to coils 208a and 208b in detection of the amount of shift of the correction lens B and limit the effective light flux incident from the front side of the lens body tube.

Operation of the image blur correction apparatus is described below.

The lens body tube is mounted on the camera body and the main switch of the camera body is set to ON. When the image blur correction start switch 19 of the lens body tube is set to ON, the power is supplied from the battery 17 to the control circuit. Image blur correcting operation is carried out in conjunction with the release button of the camera. When the release button is half-pressed, the lock mechanism is released by the plunger 218, the correction lens B is shifted in response to the output of the vibration sensor 20 and the image blur correction is carried out. When the release button is further pressed, a film is exposed as known and, after the exposure, the correction lens B is driven to the central position and locked again by the plunger 218 and the image blur correction is stopped. When the release button is released from the half-pressed state, the correction lens B is similarly locked after lapse of a specified time and the image blur correction can be stopped. When the switch 19 is turned off, the correction lens B is locked and the image blur correction is stopped.

The power of the battery 17 gradually diminishes as the image blur correction is repeated. In the present invention, when the power level of the battery 17 is detected by the image blur prevention control circuit on the printed circuit board 15 and it is determined that the correction lens B cannot be driven, the correction lens B is locked at the central position (where the optical axis for photography is aligned with the optical axis of the correction lens B) to prohibit the correcting operation.

When the battery cover fitting detection switch 21 detects that the battery cover 18 is removed, the image blur prevention control circuit locks the correction lens at the central position and prohibits the correcting operation.

In addition, when the battery cover fitting detection switch 21 detects that the battery cover 18 is removed, the image blur prevention control circuit immediately prohibits the image blur correcting operation and locks the correction lens B at the central position even though the image blur correction start switch 19 is kept on and the image blur correcting operation is being carried out according to the release signal of the camera. This prevents the correction lens B from remaining unlocked and being to be freely shiftable to cause a play in the image blur correction unit when the power supply is suddenly turned off during the correcting operation. In addition, it is intended to detect (from the state of the battery cover fitting detection switch 21) that the battery cover 18 is opened as a prestage for removing the battery 17 and lock the correction lens B at the central position wile the battery is not removed owing to the energizing force of the contact fixture 16a and the power is still supplied.

Thus the image blur prevention control circuit enables to prevent the correction lens B from being locked at the central position, uncomfortable noise due to a play of the lens unit and the correction lens B and the image blur correction unit 2 from being damaged even when the photographer inadvertently tries to replace the battery during the correcting operation.

As described above, the image blur prevention apparatus according to the above-described embodiment has at least a pair of extension parts, which respectively have U-shaped bent portions which are bent along with movement of the shifting member and are provided with conductive patterns for transmitting and receiving information between electrical components and the control circuit part, the pair of extension parts being arranged so that the bending directions of respective bent portions are approximately at right angles to each other, and provided with a flexible printed circuit board the end part of which is connected to the above-described electrical components wherein connection between the control circuit part on the printed circuit board and electrical components which are moved together with the shifting member is made with the conductive pattern and not with lead wires and the energizing force obtained from bending of a pair of extension parts may be uniformly applied even though the unit moved in any direction which orthogonally intersects the optical axis of the optical apparatus.

Accordingly, the number of man-hours for assembly can be substantially reduced and a change of the driving force depending on the shifting direction of the shifting member can be prevented.

According to the above-described embodiment, a pair of extension parts are formed in a shape extended from an opposing position in reference to the optical axis of the optical apparatus, the energizing force in th optical axis direction which acts on the shifting member in accordance with bending of the extension parts is made uniform and electrical wiring is divided into a plurality of divisions to increase the clearance between wires.

An adverse effects to the shifting member due to bending of the extension parts can be prevented and an adverse effect due to noise can be reduced.

Similarly according to the above embodiment, the extension parts are respectively provided with a first bent portion which is bent in the U shape and a second bent portion which is bent in a different direction from the bending direction of the first bent portion when the shifting member is moved from the specified position (central position) so that the energizing force of the bent portions always acts in a direction where the shifting member is forced to move to the specified position.

Therefore the shifting member can be prevented from dropping due to its own weight and current consumption for holding the shifting member at the specified position can be reduced.

The light beam deflection apparatus is not limited to installation within the lens unit and can also be provided in other equipment such as cameras, video units or the like.

The image blur prevention means according to the present invention is not limited to optical members which are moved in a plane and can have optical members which rotate around the specified axis or those such as a variable angle prism which move in other ways of movement.

Driving means for driving the optical members is not limited to a drive unit having voice coils and magnets and other driving means such as motors and stepping motors can be used.

The light beam deflection apparatus is not limited to the object of image blur prevention and can be used for other objects, for example, tracking and dynamic focusing and further intentional soft focusing and the like.

What is claimed is:

1. An optical apparatus comprising:

an optical unit which is movable in at least two different directions;

a circuit base member; and a connection member which electrically connects said optical unit and said circuit base member, and is plane-shaped, said connection member being deformable in at least two different directions so as not to disturb the movement of said optical unit to at least two different directions.

2. An apparatus according to claim 1, wherein said optical unit is movable in a first direction and a second direction different from the first direction, and said connection member connects said optical member and said circuit base member so as to absorb a displacement of said optical unit in the first direction and a displacement of said optical unit in the second direction.

3. An apparatus according to claim 2, wherein the first and second directions are different from an alignment direction of said optical unit and said circuit base member.

4. An apparatus according to claim 3, wherein the alignment direction substantially coincides with an optical axis direction of said optical unit.

5. An apparatus according to claim 3, wherein a lengthwise direction of at least a portion of said connection member is substantially parallel to the alignment direction.

6. An apparatus according to claim 2, wherein said connection member is formed to have a plane and arranged so that the first direction is a direction which is substantially aligned with the plane and the second direction is a direction which substantially intersects the plane.

7. An apparatus according to claim 2, wherein a displacement of said optical unit in the first direction is absorbed by deformation of said connection member and a displacement of said optical unit in the second direction is absorbed at a connecting part with the other member.

8. An apparatus according to claim 7, wherein a slit which enables absorption of the displacement in the second direction are provided at the connecting part of said connection member and said circuit base member.

9. An apparatus according to claim 1, wherein said connection member is formed to have a plane.

10. An apparatus according to claim 1, wherein the apparatus has at least two connection members.

11. An apparatus according to claim 10, wherein at least said two connection members are arranged apart from each other.

12. An apparatus according to claim 11, wherein one of at least said two connecting parts is connected to said optical unit at a first position of the optical unit and the other is connected to said optical unit at a second position, which is diagonal to the first position, of the optical unit.

13. An apparatus according to claim 11, wherein at least said two connection members are arranged to be kept away from each other on said optical unit or on said circuit base member.

14. An apparatus according to claim 10, wherein said circuit base member has a hole through which a light passing through said optical unit passes.

15. An apparatus according to claim 1, wherein said optical unit comprises means for deflecting a light beam by shifting said means in at least said two different directions.

16. An apparatus according to claim 15, wherein said optical unit has means for carrying out an image blur preventing operation by deflecting the light beam.

* * * * *

UNITED STATES PATENT AND TRADEMARK OFFICE
CERTIFICATE OF CORRECTION

PATENT NO. : 5,602,675
DATED      : February 11, 1997
INVENTOR(S): TADANORI OKADA It is certified that error appears in the above-indentified patent and that said Letters Patent is hereby corrected as shown below:

COLUMN 5

Line 17, "side" should read --side in--.
    Line 19, "214(a)," should read --214a,--.
    Line 36, "241(a)" should read --214a--.

COLUMN 7

Line 65, "wile" should read --while--.

COLUMN 8

Line 34, "th" should read --the--.
    Line 39, "effects" should read --effect--.

Signed and Sealed this

Twenty-sixth Day of August, 1997

*Attest:*

BRUCE LEHMAN

*Attesting Officer*      *Commissioner of Patents and Trademarks*